United States Patent [19]
Pappas et al.

[11] Patent Number: 5,870,458
[45] Date of Patent: Feb. 9, 1999

[54] AUTOMATIC FACSIMILE/DATA/VOICE SWITCH

[76] Inventors: Paul M. Pappas, 2623A Yanceyville St., Greensboro, N.C. 27405; Edward J. Riggs, 804 Ashebrook Dr., Greensboro, N.C. 27409

[21] Appl. No.: 865,820

[22] Filed: May 30, 1997

[51] Int. Cl.[6] .................................................. H04M 11/00
[52] U.S. Cl. .................................. 379/93.11; 379/100.15
[58] Field of Search ............................ 379/93.11, 100.15, 379/93.05–93.09, 100.16, 373

[56] References Cited

U.S. PATENT DOCUMENTS 5,471,522  11/1995  Sells et al. ........................... 379/93.11
5,499,287   3/1996  Campbell et al. .................... 379/93.11

*Primary Examiner*—Wing F. Chan

[57] ABSTRACT

An electronic device connecting a single telephone line conductor pair to voice, data modem, and facsimile equipment automatically detects the nature of each incoming call and switches the telephone line to the appropriate equipment connection without requiring human intervention. Incoming calls are classified by the detection or lack of detection of CNG and data modem reverse originate, or originate carrier signal evoked by sending mixed ringback and data answer carrier. The invention forwards distinctive ring and optionally detects, stores, and forwards Automatic caller Number Identification (ANI) signals to selected equipment. To protect incoming and outgoing calls from interruption, the invention provides busy signal to the devices not selected.

7 Claims, 2 Drawing Sheets

AUTOMATIC FACSIMILE/DATA/VOICE SWITCH

BACKGROUND OF THE INVENTION

1. Field of the Invention

This invention pertains to devices used to connect a single subscriber telephone line to voice, data modem, and facsimile devices

2. Description of the Prior Art

Prior art provides numerous, but incomplete methods to connect voice, data modem, and facsimile equipment to a single subscriber telephone line. The most common form of the prior art connect only fax and voice to a single subscriber line and do not process data modem calls. In all instances of prior art, proper switching of the line to voice, fax, and data modem equipment requires special subscriber line services such as distinctive ring or human intervention on the calling or receiving end to properly distinguish between voice, data modem, and facsimile calls. In some instances of prior art, this intervention takes the form of additional DTMF sequences which maybe stored as a part of the dialing sequence used by the caller's equipment or entered by the caller manually. This requires either the caller have prior knowledge of the DTMF sequence required by the receiving device or the receiving device query the caller for the DTMF sequence. In another example, the voice caller must respond vocally to a stored query so that a voice signal detection circuit in the receiving equipment can identify a voice call. This intrusive method fails when the caller pauses sufficiently, as can happen with a PBX operator momentarily on hold, or with a speaker unfamiliar with the selected language of the stored message. In instances of prior art where carrier signals are placed on the subscriber line to query the presence of a fax or data modem, the methodology used is intrusive to voice callers.

Examples of relevant prior art, all of which contain one or more of the above limitations, are U.S. Pat. No. 4,660,218 to Hashimoto (1987), U.S. Pat. No. 4,821,312 to Horton et. Al. (1989), U.S. Pat. No. 4,852,153 to Streck (1989), U.S. Pat. No. 4,856,049 to Streck (1989), U.S. Pat. No. 4,879,741 to Liu (1989), U.S. Pat. No. 4,910,764 to Bowen (1990), U.S. Pat. No. 5,022,071 to Mozer et. al. (1991), U.S. Pat. No. 5,056,132 to Coleman et. Al. (1991), U.S. Pat. No. 5,065,427 to Godbole (1991), U.S. Pat. No. 5,146,489 to Telibasa (1992), U.S. Pat. No. 5,151,972 to Lorenz et. Al. (1992), and U.S. Pat. No. 5,187,736 to Moriizumi (1993).

SUMMARY

An electronic device connecting a single telephone line to voice, data modem, and facsimile equipment automatically detects the nature of each incoming call and switches the telephone line to the appropriate equipment connection without requiring human intervention by either the caller or the recipient. This invention also properly switches calls between voice equipment, dedicated facsimile equipment, and equipment that combines the function of facsimile with the function of data modem. Two manual switches provide a means for the user to select operating preferences. When the user desires to route incoming facsimile calls to a "data/fax modem" connected to the modem connector, he sets a "data/fax modem" switch to the "data/fax modem" setting. Otherwise, incoming "fax" calls are routed to a facsimile connector. A second switch labeled "ANI" is used to enable or disable ANI capture and forwarding. When the user sets the ANI switch to the off position, the invention omits ANI processing and asserts offhook condition on the subscriber line immediately after the first ring of an incoming call. The user may also set ANI on for use with call forwarding to avoid unnecessary subscriber line offhook condition (pick-up). Indicators are provided to show power-on, and line status for each of the subscriber line, the voice equipment connections, the data modem connection, and the facsimile connection.

The invention detects incoming ring signals, including distinctive ring, and stores the ring pattern. If Automatic caller Number Identification (ANI) processing is selected by switch setting, it detects and stores the ANI signals, then asserts the off-hook condition, otherwise off-hook is asserted immediately after the first ring. If CNG signal is detected during the first testing period, the invention connects the telephone line to the facsimile connector or modem connector, as indicated by the setting of the data/fax modem switch. Otherwise, it returns a similitude of ringback signal mixed in time and amplitude with Bell 212A answer carrier signal for a predetermined second testing period, while maintaining off-hook condition. The ringback signal component is included to inform any voice caller that the call connection is still being established. The answer carrier is sent at a level and duration that are selected to be inoffensive to the caller, yet certain to evoke arbitration signal transmission from a calling data modem. If the calling equipment sends data modem reverse originate carrier or responds to the answer carrier with data modem originate carrier, the device connects the telephone line to the data modem connection, otherwise it connects the line to the voice equipment connections when the testing period has elapsed.

The connection of the line to the appropriate equipment connector proceeds as follows: the invention first switches the appropriate equipment connection to ring signal and ANI signal generators. It reproduces the stored ring pattern, then forwards the stored ANI signals, if any. When the selected equipment asserts off-hook, the invention disconnects its ring generator and ringback generator, switches the appropriate equipment connector to the subscriber line, and deasserts offhook. The invention returns to its initial state when the telephone line returns to onhook or when the calling party disconnects before connection is made to selected equipment. In the absence of power, all connected external equipment is bridge connected to the subscriber line.

REFERENCE NUMERALS IN DRAWINGS

Figure 1:
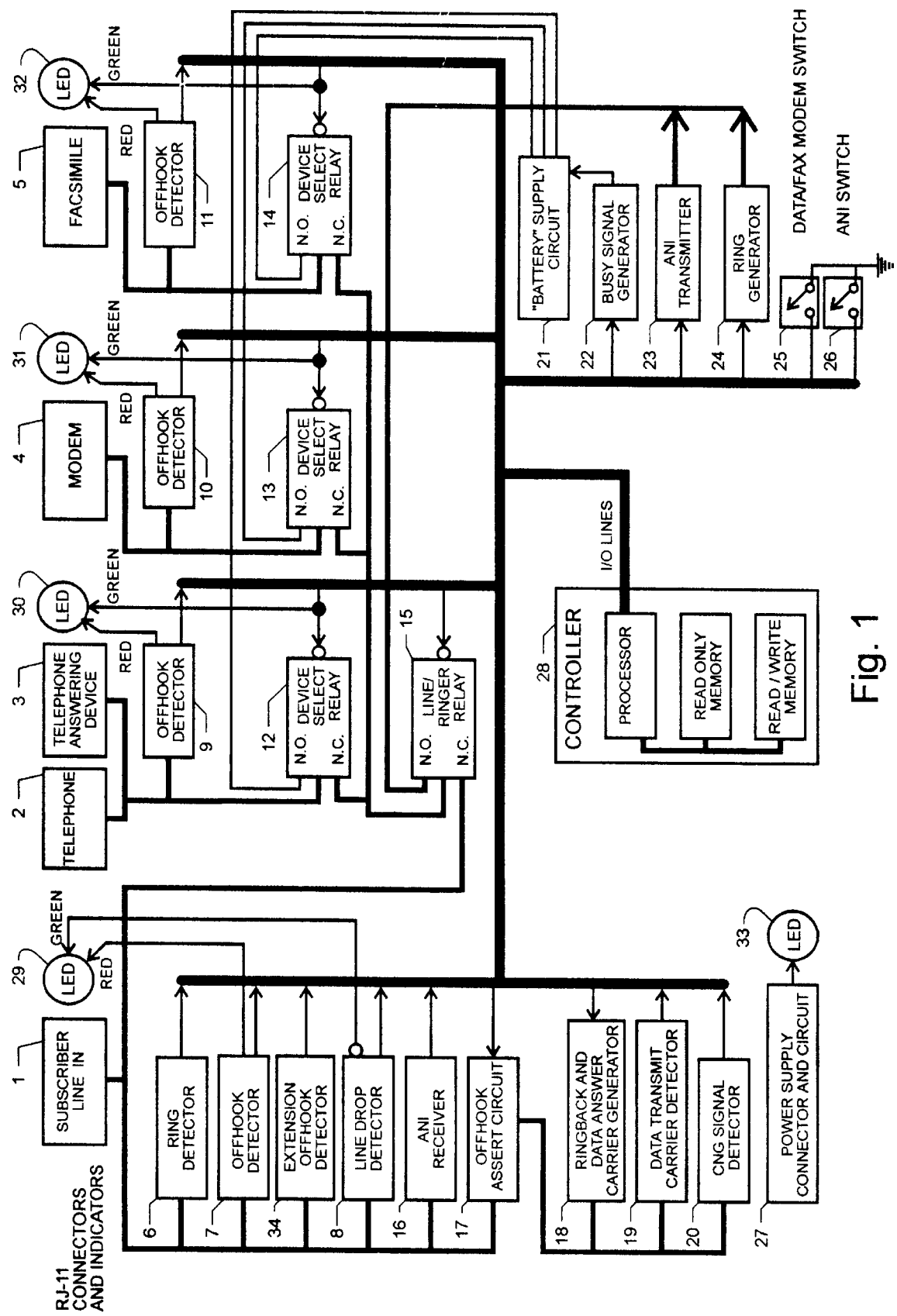
FIG. 1 is a block diagram of the telephone equipment switching device.

FIG. 1:
1: subscriber telephone line connector
2: first voice device connector
3: telephone answering device or other second voice device connector
4: data modem or data/fax modem connector
5: facsimile device connector
6: subscriber line ring, offhook, and line drop indicator
7: subscriber line offhook indicator
8: subscriber line drop indicator
9: voice device offhook detector
10: data modem offhook detector
11: facsimile offhook detector
12: voice device select relay
13: data modem device select relay 14: facsimile device select relay
15: line/ringer relay
16: ANI receiving circuit
17: offhook assert circuit
18: ringback and data answer carrier generator
19: data transmit carrier detector
20: CNG signal detector
21: battery supply circuit
22: busy signal generator
23: ANI transmitter
24: ring generator
25: data/fax modem switch
26: ANI switch
27: power supply connector and circuit
28: controller
29: subscriber telephone line status indicator
30: first voice device and telephone answering device or other second voice device line status indicator
31: data modem or data/fax modem line status indicator
32: facsimile device line status indicator
33: power-on light
34: extension line offhook detector

DESCRIPTION OF THE PREFERRED EMBODIMENT OF THE INVENTION

The preferred embodiment diagrammed in FIG. 1 comprises an enclosure, a printed wiring board assembly (i.e. circuit board), and optionally, a connector for an external power converter. The circuit board supports five modular (RJ-11) telephone jack connectors, five indicators, detection circuits, signal generators for busy, ring and ANI signals, ringback, and dataset answer carrier signals, logic circuits to effect switching to connect the Ring and Tip contacts of the telephone line connector to the corresponding contacts of the connector for the selected external equipment, power conditioning circuits, two switches for the user to select options for use of fax/data modem and ANI equipment, and a power connector.

A connector 1 is provided to connect the invention to the subscriber telephone line, a connector 2 for switched connection to a first voice device (e.g. telephone), a connector 3 for additional switched connection to a telephone answering device or other second voice device, a connector 4 for switched connection to a data modem or data/fax modem, and a connector 5 for switched connection to a facsimile device. Indicators 29 through 32 provide visible status information for circuits of connectors 1, 2 and 3, 4, and 5, respectively. Indicator 33 is the power-on light.

Detector circuits 6, 7, and 8 monitor the subscriber line for ring, offhook, and line drop states respectively. Extension line offhook detector 34 monitors the subscriber line to detect the condition in which an extension goes offhook while the invention itself is asserting offhook. Detector circuits 9, 10, and 11 monitor the voice, data modem, and facsimile lines respectively to detect the offhook state. Device select relays 12, 13, and 14 switch external equipment connectors 2 and 3, 4, and 5 respectively, to either the local "battery supply" circuit 21 with busy signal generator 22, or to line/ringer relay 15. Relay 15 switches the selected connector to the ring generator 24 and ANI transmitter 23 until off-hook is detected. Relay 15 then switches the selected connector to the subscriber telephone line. The subscriber telephone line attached to connector 1 is coupled to the ringback and data answer carrier generator 18 by a line transformer within offhook assert circuit 17. Detector circuits 19 and 20 are also coupled to the line by the offhook assert circuit 17. The ANI receiver circuit 16 decodes Automatic caller Number Identification (ANI) signals so that they may be read and stored by the controller 28. The ANI transmitter 23 encodes and sends to selected equipment the ANI information supplied by the controller 28. A battery supply circuit 21 provides battery voltage to the switched circuits at connectors 2, 3, 4, and 5 when these circuits are not connected to the telephone line. A ring generator 24 provides ring voltage for selected external equipment. A busy signal generator 22 provides busy signal for non-selected external equipment. The data/fax modem switch 25 provides a means for the user to indicate to the controller 28 whether to route incoming fax calls to connector 4 or to connector 5. Switch 26 provides a means for the user to indicate to the controller 28 whether to enable or omit ANI signal capture and forwarding. A controller 28 monitors the sense signals from the various detector circuits and switches 25 and 26, and correspondingly operates the relays, signal generators, and battery supply circuit. A power supply circuit 27 conditions electrical power from an external wall outlet transformer, or optionally from the subscriber telephone line circuit, and provides power at various voltages as needed by the various other circuits.

Figure 2:
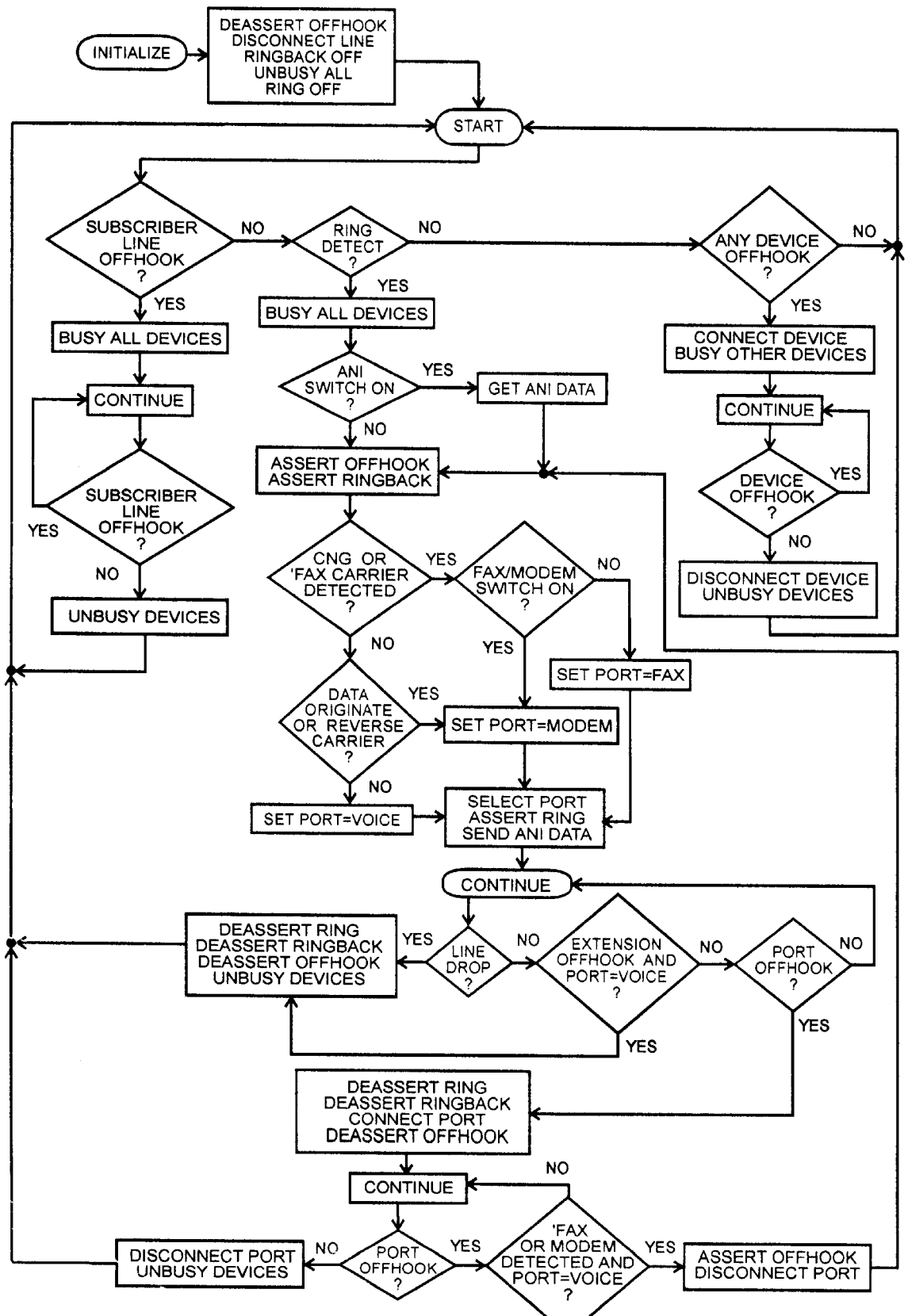
FIG. 2 is a flow chart of the operations of the preferred embodiment of the present invention.

The operation of the preferred embodiment of the invention is depicted in FIG. 2. When power is applied, the invention performs initialization functions such as setting stack pointer, interrupt, timer, and input/output control registers. Relays 12 through 15 are set to switch the external equipment from the subscriber line to the local battery circuit. Circuits 17, 18, 22, 23, and 24 are reset to deassert offhook, ringback, ring, and busy. Process flow of the invention next enters the operating loop at START, wherein the controller 28 first tests the subscriber line for offhook condition by reading the output of offhook detector 7. If the subscriber line is offhook, the controller asserts the busy signal generator 22 until the subscriber line goes onhook. The process then returns to START.

If the subscriber line is onhook, the controller 28 next tests the subscriber line for the presence of ring signal by reading the output of ring detector 6. When ring detector 6 indicates an incoming call, the process flow branches to capture any ANI data present if ANI switch 26 is enabled. The nature of the call is determined by asserting offhook on the subscriber line by activating the offhook circuit 17, providing ringback mixed with data answer carrier by activating generator circuit 18. The invention then first tests the output of CNG signal detector 20 for facsimile CNG signal. If CNG is detected, the data/fax modem switch is tested. If the switch is on, a program variable PORT is then set to the value MODEM, otherwise it is set to the value FAX. PORT indicates, or points to the external equipment connector to be selected. If CNG is not detected, then data transmit carrier detector 19 is tested to detect data modems which send evoked data originate carrier or data reverse originate carrier. If detector 19 is active, PORT is set to the value MODEM. If neither CNG nor data modem carrier is detected, the call is a voice call and PORT is set to the value VOICE. Coil power is then dropped from the relay corresponding to the value stored in PORT. This connects the selected equipment connector to the ANI transmitter 23 and ring generator 24. If ANI information was stored, the controller 28 now uses ANI transmitter 23 to forward it to the selected equipment.

The program now loops with ring generator active, testing line drop detector 8 and the selected equipment offhook detector until either the line is dropped or the selected equipment goes offhook. If the line is dropped before the equipment goes offhook, the ring generator is deasserted and the selected relay coil power is restored to switch the selected equipment from the ring generator to local battery. The program then returns to START.

If the selected equipment goes offhook before the line is dropped, coil power to relay 15 is removed to switch the selected equipment to the subscriber line. Ring generator 24 and offhook circuit 17 are deasserted and the program now loops, testing the selected offhook detector until the selected equipment goes onhook. When the selected equipment goes onhook, coil power is restored to relay 15 and the selected relay to switch the selected equipment from the subscriber line to the local battery circuit. The busy generator 22 is deasserted and the program now returns to START.

If no ring signal is detected on the subscriber line, each of the external device connectors 2 and 3, 4, and 5 is then tested for offhook by reading the output of offhook detectors 9, 10, and 11 respectively. If no device is offhook the process returns to START.

If an external device goes offhook, the device is connected to the line by removing power from the coil of its corresponding line relay and relay 15. The controller 28 also asserts busy generator 22. When the device returns to the onhook state, busy signal generator 22 is deasserted and the device is switched back to the local battery circuit by applying power to the coils of its line relay and relay 15. The process flow then returns to the state labeled START.

We claim:

1. A telephone equipment switching device comprising
a connector means to connect external voice equipment, external facsimile equipment, external data modem equipment, and a single telephone line conductor pair;
a means to detect ring signal on the telephone line circuit;
a means to detect line drop condition on the telephone line circuit;
a means to assert off-hook condition on the telephone line circuit;
a means to generate and transmit into the telephone line circuit mixed ringback and dataset answer carrier signals;
a means to detect dataset originate carrier on the telephone line circuit;
a means to detect dataset reverse originate carrier on the telephone line circuit;
a means to detect facsimile CNG signal on the telephone line circuit;
a means to detect facsimile carrier signal on the telephone line circuit;
a means to generate battery voltage, busy signal, and ring signal to connected external equipment;
a means to detect off-hook and on-hook conditions of said equipments connected to said switching device;
a means to connect a selected equipment to the single telephone line conductor pair;
and a control means to effect operation of said means to connect selected equipment to the telephone line conductor pair.

2. A telephone equipment switching device as claimed in claim 1, further comprising a means to select one mode of operation to service said external facsimile and data modem equipment, or a second mode of operation to service a combined data/facsimile device.

3. A telephone equipment switching device as claimed in claim 1, further comprising a means to store and forward automatic caller number identification (ANI) signals to selected equipment.

4. A telephone equipment switching device as claimed in claim 1, further comprising a means to store and forward distinctive ring signal to selected equipment.

5. A telephone equipment switching device as claimed in claim 2, further comprising a means to store and forward automatic caller number identification (ANI) signals to selected equipment.

6. A telephone equipment switching device as claimed in claim 2, further comprising a means to store and forward distinctive ring signal to selected equipment.

7. A telephone equipment switching device as claimed in claim 3, further comprising a means to store and forward distinctive ring signal to selected equipment.

* * * * *